United States Patent
Ma et al.

(10) Patent No.: US 11,883,850 B2
(45) Date of Patent: Jan. 30, 2024

(54) ARTICLE CONVEYING EQUIPMENT, SYSTEM AND METHOD

(71) Applicant: Beijing GeekPlus Technology Co., Ltd., Beijing (CN)

(72) Inventors: Qingguang Ma, Beijing (CN); Hongbo Li, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 14 days.

(21) Appl. No.: 17/650,497

(22) Filed: Feb. 9, 2022

(65) Prior Publication Data

US 2022/0266305 A1 Aug. 25, 2022

Related U.S. Application Data

(63) Continuation of application No. 16/643,223, filed as application No. PCT/CN2018/098241 on Aug. 2, 2018, now Pat. No. 11,273,467.

(30) Foreign Application Priority Data

Sep. 30, 2017 (CN) .......................... 201710927735.2
Sep. 30, 2017 (CN) .......................... 201710927756.4

(51) Int. Cl.
*B07C 3/02* (2006.01)
*B65G 47/51* (2006.01)
(Continued)

(52) U.S. Cl.
CPC ............ *B07C 3/02* (2013.01); *B65G 47/5104* (2013.01); *B65G 47/74* (2013.01);
(Continued)

(58) Field of Classification Search
CPC ............................. B65G 41/005; B65G 41/008
See application file for complete search history.

(56) References Cited

U.S. PATENT DOCUMENTS 4,679,977 A * 7/1987 Minami ................. B62D 63/02
414/533
4,741,412 A * 5/1988 Sable ..................... B66F 9/063
187/244

(Continued)

FOREIGN PATENT DOCUMENTS

CN 104340573 2/2015
CN 104555222 4/2015
(Continued)

OTHER PUBLICATIONS

Office action dated Nov. 12, 2019 in corresponding Japanese Application No. 2019-516243.

*Primary Examiner* — William R Harp
(74) *Attorney, Agent, or Firm* — ArentFox Schiff LLP (57) ABSTRACT

An article conveying equipment includes: a carrying apparatus, configured to carry one or more articles to be transported; a travelling apparatus, where the travelling apparatus includes at least two driving wheels located at the bottom of the travelling apparatus, the at least two driving wheels are configured to control the travelling apparatus to rotate in a first rotation direction; and a rotation supporting apparatus, which is located between the carrying apparatus and the travelling apparatus and connected to the carrying apparatus and the travelling apparatus respectively, where the rotation supporting apparatus is configured to rotate in a direction opposite to the first rotation direction when the travelling apparatus rotates in the first rotation direction.

19 Claims, 5 Drawing Sheets

(51) Int. Cl.
 *B65G 47/74* (2006.01)
 *G06K 7/10* (2006.01)
(52) U.S. Cl.
 CPC .. *B07C 2501/0063* (2013.01); *B65G 2201/02* (2013.01); *G06K 7/10445* (2013.01)

(56) References Cited

U.S. PATENT DOCUMENTS

| | | | | |
|---|---|---|---|---|
| 4,818,171 | A * | 4/1989 | Burkholder | B65G 1/0485 |
| | | | | 414/495 |
| 9,120,622 | B1 * | 9/2015 | Elazary | B25J 9/1697 |
| 9,637,318 | B2 * | 5/2017 | Messina | B65G 37/00 |
| 10,048,697 | B1 * | 8/2018 | Theobald | G05D 1/0088 |
| 10,106,383 | B2 * | 10/2018 | Shen | B66F 7/0625 |
| 10,793,369 | B2 * | 10/2020 | Sekich | B65G 43/08 |
| 11,273,467 | B2 * | 3/2022 | Ma | B66F 3/24 |
| 11,407,590 | B1 * | 8/2022 | Pajevic | B66F 9/063 |
| 2017/0158438 | A1 * | 6/2017 | Berdelle-Hilge | B07C 3/02 |

FOREIGN PATENT DOCUMENTS

| | | |
|---|---|---|
| CN | 105712249 | 6/2016 |
| CN | 105775651 | 7/2016 |
| CN | 106218475 | 12/2016 |
| CN | 106347948 | 1/2017 |
| CN | 206327822 | 7/2017 |
| CN | 107096722 | 8/2017 |
| CN | 206528899 | 9/2017 |
| CN | 207385956 | 5/2018 |
| CN | 207632054 | 7/2018 |
| JP | 2006044934 | 2/2006 |
| JP | 2007112523 | 5/2007 |
| JP | 2009298223 | 12/2009 |
| JP | 2013023313 | 2/2013 |
| JP | 2016055942 | 4/2016 |
| WO | 2007011871 | 1/2007 |
| WO | 20161249999 | 8/2016 |

* cited by examiner

ARTICLE CONVEYING EQUIPMENT, SYSTEM AND METHOD

The present application is a Continuation of U.S. application Ser. No. 16/643,223, which is a national stage application of International Application PCT/CN2018/098241 filed Aug. 2, 2018, which claims priority to Chinese patent application No. 201710927735.2 filed on Sep. 30, 2017 to the CNIPA and Chinese patent application No. 201710927756.4 filed on Sep. 30, 2017 to the CNIPA, the disclosure of all of which are incorporated in the present application by reference in their entireties.

TECHNICAL FIELD

The present disclosure relates to the field of intelligent logistics, for example, to an article conveying equipment, system and method.

BACKGROUND

The rapid development of e-commerce has brought unprecedented development opportunities to the express delivery industry, but also presented severe challenges to express delivery services. How to efficiently, flexibly and accurately sort parcels with low costs has always been a difficult problem for this industry. The traditional manual matrix sorting mainly faces problems of low efficiency, high error rate, heavy labor intensity, the difficult employee recruitment and difficult management. In recent years, the vigorous development of robot technology has brought huge technological changes to the entire logistics industry, and brought new technologies and new design concepts to the sorting industry. In an express robot sorting system, an operator places the parcel on a robot carrying apparatus at a feeder, and the robot carries the parcel to the location of a steel article-falling lattice mouth to convey the parcel to the article-falling lattice mouth to complete the parcel sorting task. The above-mentioned parcel sorting robot system greatly improves the sorting efficiency compared with the traditional manual sorting manner, has the advantages of low cost and high flexibility compared with the traditional automatic method such as the cross-belt sorter, and thus has been widely concerned and rapidly popularized in the industry.

SUMMARY

The present disclosure provides an article conveying equipment, system and method, which at least partially solve the problem of fragile goods damaged because of a height difference after an express robot conveys the goods to a receiving end.

Provided is an article conveying equipment, including a carrying apparatus, a travelling apparatus, and a rotation supporting apparatus.

The carrying apparatus is configured to carry one or more articles to be transported.

The travelling apparatus includes at least two driving wheels located at the bottom of the travelling apparatus, and the at least two driving wheels are configured to control the travelling apparatus to rotate in a first rotation direction.

The rotation supporting apparatus is located between the carrying apparatus and the travelling apparatus and connected to the carrying apparatus and the travelling apparatus respectively, and the rotation supporting apparatus is configured to rotate in a direction opposite to the first rotation direction when the travelling apparatus rotates in the first rotation direction. Further provided is an article conveying system, including an article conveying equipment and a transferring apparatus.

The article conveying equipment is provided with a carrying apparatus, and the carrying apparatus is configured to carry one or more articles to be transported.

The transferring apparatus is in a communication connect with the article conveying equipment and includes a receiving end configured for receiving the one or more articles to be transported, and the transferring apparatus is configured to automatically receive by the receiving end the one or more articles to be transported delivered by the article conveying equipment matching a current task and transfer the received one or more articles to be transported to a destination.

Further provided is an article conveying method, including:

using a carrying apparatus on an article conveying equipment to carry one or more articles to be transported; and using a receiving end of a transferring apparatus in a communication connection with the article conveying equipment to automatically receive the one or more articles to be transported delivered by the article conveying equipment matching a current task and deliver the received one or more articles to be transported to a destination.

BRIEF DESCRIPTION OF DRAWINGS

The drawings used in the embodiments will be described below.

DETAILED DESCRIPTION

A description of the embodiments of the present disclosure will be given below with reference to the drawings.

After an express robot obtains a parcel to be transferred, usually the parcel needs to be conveyed automatically into a corresponding receiving container. In practical operation, due to different application scenarios, the height of a receiving container receiving the parcel is different. Therefore, the express robot cannot automatically unload the parcels when the parcels are conveyed to the destination. For example, if a receiving end of the receiving container is too low, fragile goods may be damaged because of a height difference when the express robot conveys the parcels to the receiving end of the receiving container.

Figure 1:
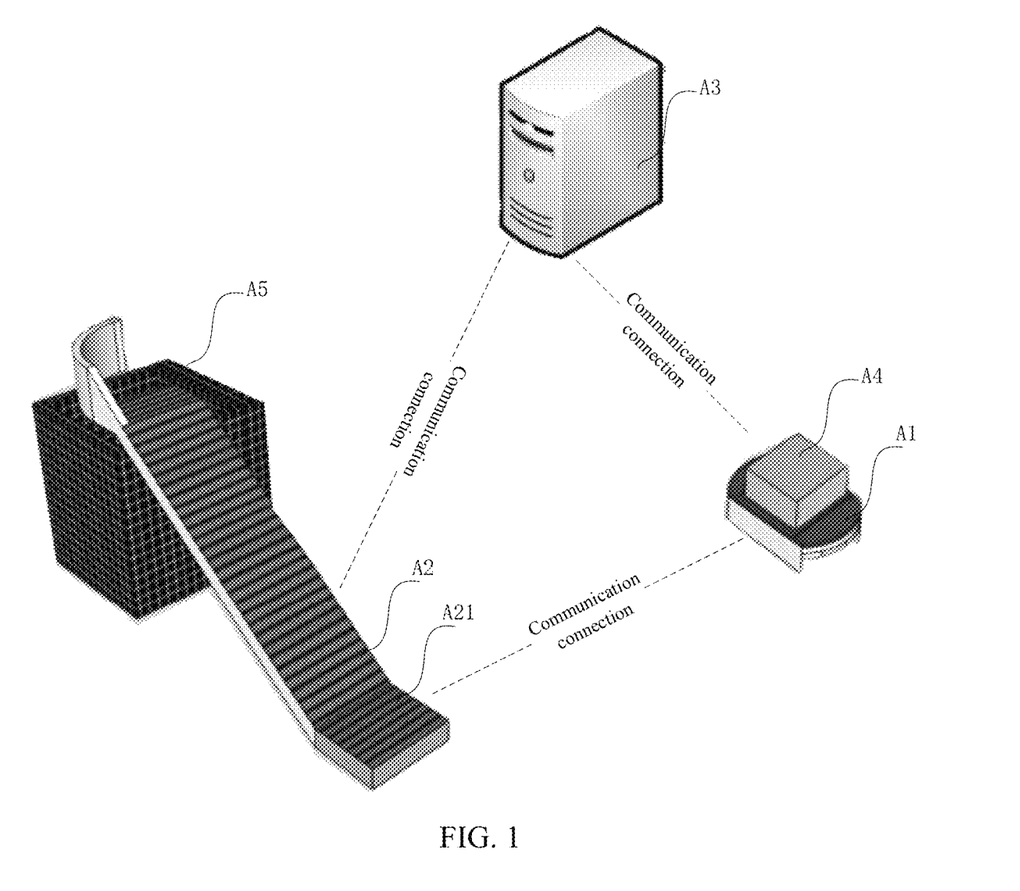
FIG. 1 is a schematic diagram of an article conveying system according to an embodiment of the present application.

FIG. 1 is an article conveying system provided by this embodiment. The article conveying system includes an article conveying equipment A1 and a transferring apparatus A2.

The article conveying equipment A1 is provided with a carrying apparatus. The carrying apparatus is configured to carry one or more articles to be transported.

The carrying apparatus is configured to carry one or more articles to be transported. The article to be transported may be a parcel or other articles to be transported. The carrying apparatus is a common apparatus with a holding structure. When the article conveying equipment arrives at an article sending end (such as a feeding end that sends the article), the article may be placed on the carrying apparatus in a manual way, or the article to be transported, such as an article to be sorted, may be automatically placed by an automatic loading device (such as a manipulator) at the feeding end.

According to different conveying tasks, the carrying apparatus is capable of receiving one or more articles to be transported. The destinations of the one or more articles to be transported may be the same or different. When the delivery destinations are the same, the carrying apparatus may transport the article to be transported to an article receiving end (such as a conveyor belt and a cage trolley) at one time or in batches. When the delivery destinations are different, the carrying apparatus may release a corresponding article to be transported at article receiving ends representing different destinations, which can make full use of the space of the carrying apparatus and improve the efficiency of the article conveying equipment A1. In an embodiment, the article conveying equipment with an adaptive height may be a parcel delivery robot, and may also be other devices having the same or similar functions.

In an embodiment, after the carrying apparatus receives the article, the article conveying equipment A1 may learn article information of the article to be transported. The article information includes a delivery destination of the article to be transported (such as Beijing Haidian district) and the type of the article to be transported (such as a book or fragile goods). After learning the article information, the article conveying equipment A1 may obtain information of the transferring apparatus (such as a conveyor belt, a conveyor elevator and a cage trolley) corresponding to the article to be transported by inquiring a server. By inquiring the information of the transferring apparatus, a height of the receiving end A21 of the transferring apparatus matched with the article conveying equipment A1 is inquired. On one hand, the height of the receiving end A21 of the transferring apparatus matched with the article conveying equipment A1 may be issued by the server. On the other hand, a height database may exist inside the article conveying equipment A1, and the article conveying equipment A1 learns height information of the receiving end A21 of the transferring apparatus by inquiring the height database.

When the article conveying equipment A1 approaches the transferring apparatus, the height adjusting apparatus of the article conveying equipment A1 adjusts the height of the carrying apparatus so that the height of the carrying apparatus is matched with the height of the receiving end A21. The height adjusting apparatus may be a common hydraulic lifting apparatus, may also be a common helical lifting apparatus, and may also be other common lifting apparatuses, which is not limited herein. The transferring apparatus A2 is in a communication connection with the article conveying equipment A1. The transferring apparatus A2 and the article conveying equipment A1 may be directly connected in a wired or wireless (WIFI, Bluetooth, infrared, radio frequency, etc.) manner, or may be in an indirect communication connection by connecting to a server A3 illustrated in FIG. 1.

The article conveying equipment and the transferring apparatus are configured to be in a communication connection, so that the transferring apparatus is able to automatically receive by the receiving end the articles to be transported delivered by the article conveying equipment matching the current task. Furthermore, when the articles are delivered to the receiving end, the transferring apparatus may automatically adjust its height, so that the automation of the article conveying is guaranteed thus improving the article conveying efficiency.

The transferring apparatus A2 has the receiving end A21. The receiving end A21 may receive the article A4 delivered by the article conveying equipment A1. The article A4 is delivered to a corresponding receiving container A5 (e.g., a cage trolley, a package bag, etc.) through a delivery device (e.g., a conveyor belt) on the transferring apparatus. The transferring apparatus A2 has the receiving end A21 for receiving the one or more articles to be transported. The transferring apparatus A2 automatically receives articles to be transported delivered by the article conveying equipment A1 matching a current task through the receiving end A21 and transfers the received articles to be transported to the destination.

To determine a transport destination of the article to be sorted, a transport label usually is disposed on the article to be sorted for storing the delivery information. The transport label may be a two-dimensional code, a radio frequency identification devices (RFID) label or the like. The delivery information of the article to be sorted at least includes information about the transport destination of the article (such as Guangzhou, Shanghai or Shenyang), and may also include other information. According to a specific implementation, the article to be transported includes path information, and the article conveying equipment A1 is capable of obtaining the path information of the article to be transported.

To identify the delivery information of the article to be sorted quickly, the feeding end may include a conveying information acquisition apparatus for identifying the transport label on the article to be sorted. The conveying information acquisition apparatus may be a camera. The camera acquires label information, such as the two-dimensional code of the article to be sorted, thereby obtaining the delivery information of the article to be sorted. In addition, the conveying information acquisition apparatus may also be a RFID card reader. The RFID card reader reads RFID label information on the article to be sorted, thereby obtaining the delivery information of the article to be sorted. The article conveying equipment A1 may obtain path information of the article to be transported obtained by the delivery information obtaining device by querying the server, or may also integrate the conveying information acquisition apparatus into the article conveying equipment A1 to obtain related information.

Figure 2:
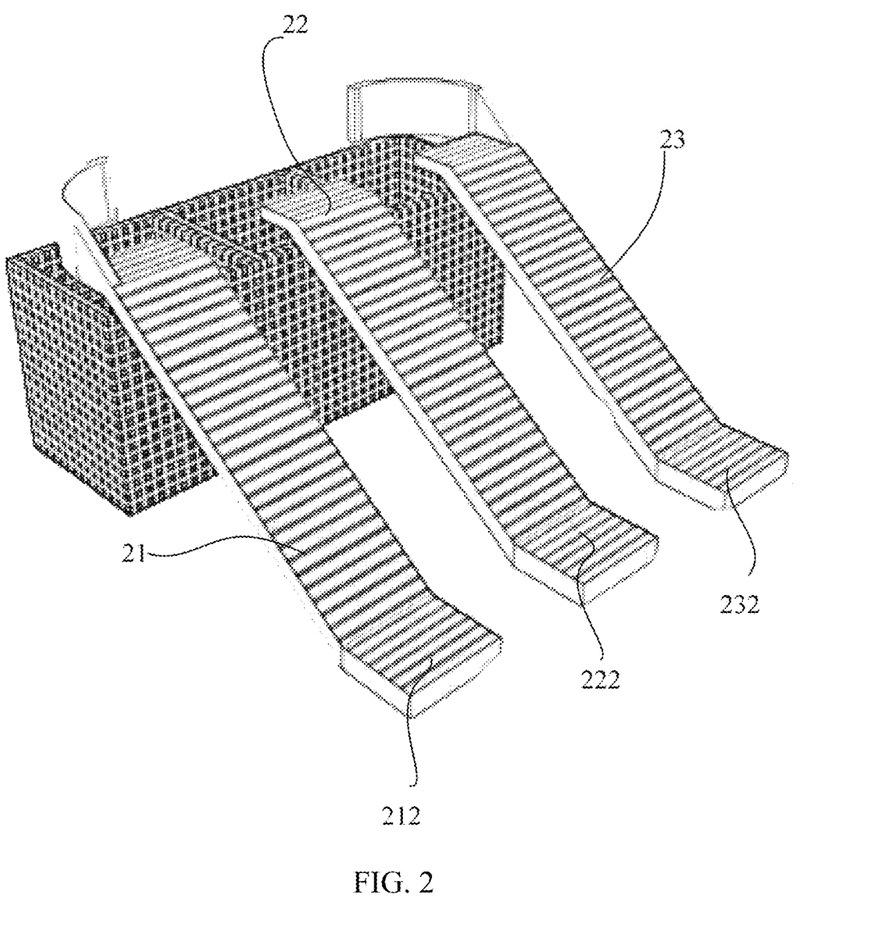
FIG. 2 is a structural diagram of a transferring apparatus according to an embodiment of the present application.
Figure 3:
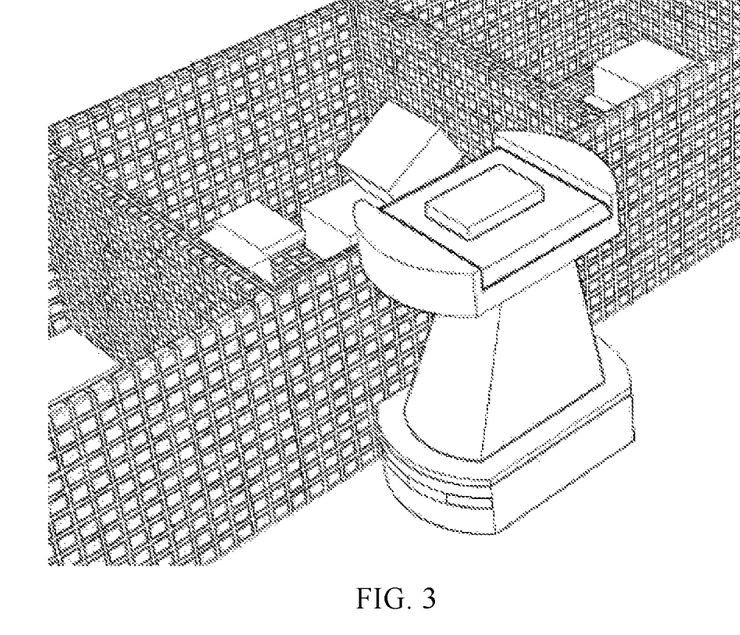
FIG. 3 is a schematic diagram illustrating that an article conveying equipment conveys an article to a transferring apparatus according to an embodiment of the present application.

In an embodiment, the transferring apparatus A2 is provided with an identify (ID) label. The ID is matched with the path information of the article to be transported. Referring to FIG. 2, the transferring apparatus includes multiple conveyor belts 21, 22 and 23. Each conveyor belt conveys the goods to a receiving container with different path after lifting the goods to a certain height. In addition to lifting conveyor belts shown in FIG. 2, the conveyor belt may also be a plane conveyor belt, or a conveyor belt conveying the goods to a lower position. The bottom of each conveyor belt is provided with a receiving end 212, 222 and 232. The height of the receiving end may be the same or different. The height value of the receiving end of the conveyor belt with different number is stored in the server. In addition to the case shown in FIG. 2, the transferring apparatus may also be an article receiving apparatus (such as the cage trolley) with a certain height as shown in FIG. 3. In this case, the edge of the article receiving apparatus forms the receiving end.

In an embodiment, the server invokes the article conveying equipment A1 in the way of tasks. The article conveying equipment A1 acquires the path information of the article to be transported in the current task, and determines, based on the path information of the article to be transported in the current task, the transferring apparatus A2 matched with the current task.

The server mentioned in the above embodiment may be a scheduling server or other types of servers. In an embodiment, the communication apparatus is further configured to be communicatively connected to the scheduling server and acquire information of the transferring apparatus by the scheduling server.

Figure 4:
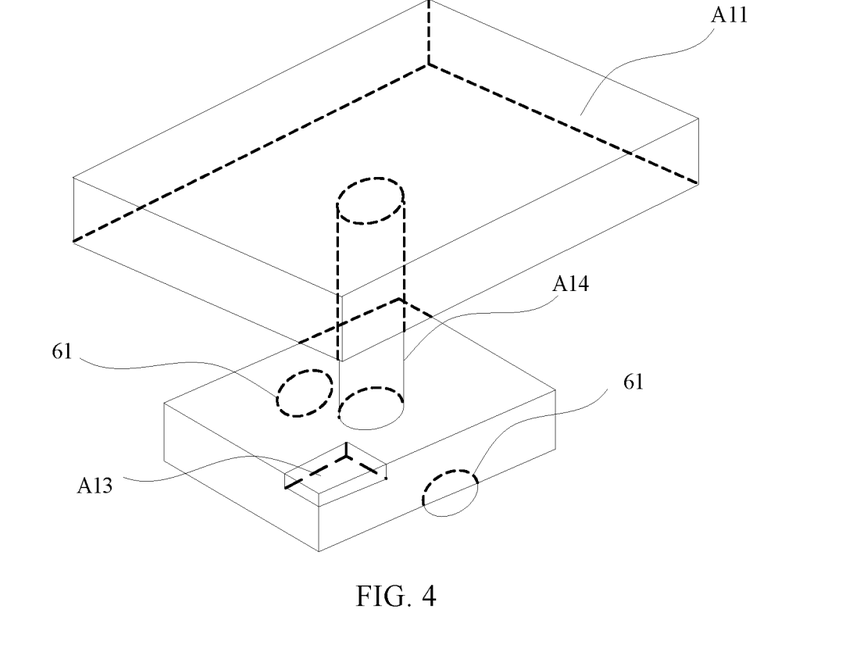
FIG. 4 is a structural diagram of an article conveying equipment according to an embodiment of the present application.

FIG. 4 is a structural diagram of a mobile conveying equipment according to an embodiment of the present application. The article conveying equipment A1 may include a carrying apparatus A11, a first height adjustment apparatus A14, and a communication apparatus A13. The carrying apparatus A11 may carry one or more articles to be transported. The communication apparatus A13 may be in a communication connection with the server or the transferring apparatus A2. According to a specific implementation, the article conveying equipment A1 has the first height adjustment apparatus A14 which may adjust a height of the carrying apparatus.

According to a specific implementation, the article conveying equipment A1 obtains a height of the receiving end A21 of the transferring apparatus A2 matching the current task and controls the first height adjustment apparatus to lift the carrying apparatus to a first preset height. The first preset height matches the height of the receiving end A21 of the transferring apparatus A2 matching the current task.

According to a specific implementation, the transferring apparatus A2 includes a second height adjustment apparatus, which is operative to adjust the height of the receiving end A21. The article conveying equipment A1 and the transferring apparatus A2 respectively adjust their own heights, thereby providing even wider range of height matching in the process of article transportation.

According to a specific implementation, the transferring apparatus A2 obtains a height of the carrying apparatus of the article conveying equipment A1 matching the current task and controls the second height adjustment apparatus to adjust the receiving end A21 to a second preset height, which matches the height of the carrying apparatus of the article conveying equipment A1 matching the current task.

According to a specific implementation, the system further includes:
a scheduling server, which is connected to at least one selected from the group consisting of the article conveying equipment A1 and the transferring apparatus A2. The server illustrated in FIG. 1 may be one specific application of the scheduling server.

To facilitate the operation of the article conveying equipment A1, optionally, the article conveying equipment A1 is provided with a battery inside. In this case, the article conveying equipment A1 can complete the transport task by its own energy. The article conveying equipment A1 monitors a remaining electric quantity of the battery in real time. When the remaining electric quantity of the article conveying equipment A1 reaches to a certain threshold value, the article conveying equipment A1 is automatically controlled to go to a preset area to be charged. In addition, the article conveying equipment A1 can acquire electric quantity information of the article conveying equipment A1. When the remaining electric quantity of the article conveying equipment A1 meets a preset condition, the article conveying equipment A1 reports information about remaining electric quantity to the scheduling server, and the scheduling server comprehensively determines whether to control the article conveying equipment A1 to go to the preset area to get charged according to multiple factors such as current electric quantity and a scheduling task.

When the remaining state of charge of the article conveying equipment A1 meets a preset condition, the scheduling server may control the article conveying equipment A1 to move to a preset area to get charged.

In an embodiment, the article conveying equipment A1 is configured to be navigated by identifying a combination of graphics. The combination of graphics may be a two-dimensional code or any combination of graphics composed of other graphics. The article conveying equipment determines current geographic location information by identifying the combination of graphics.

In an embodiment, an article transporting apparatus is disposed on the carrying apparatus A11. For example, the article to be transported is located on the article transporting apparatus. The article transporting apparatus is configured to transport the article to be transported on the carrying apparatus A11 to a designated destination. The article transporting apparatus includes any one of a conveyer belt, a roller, a cross belt, a turning panel or other apparatuses which can move articles.

Figure 7:
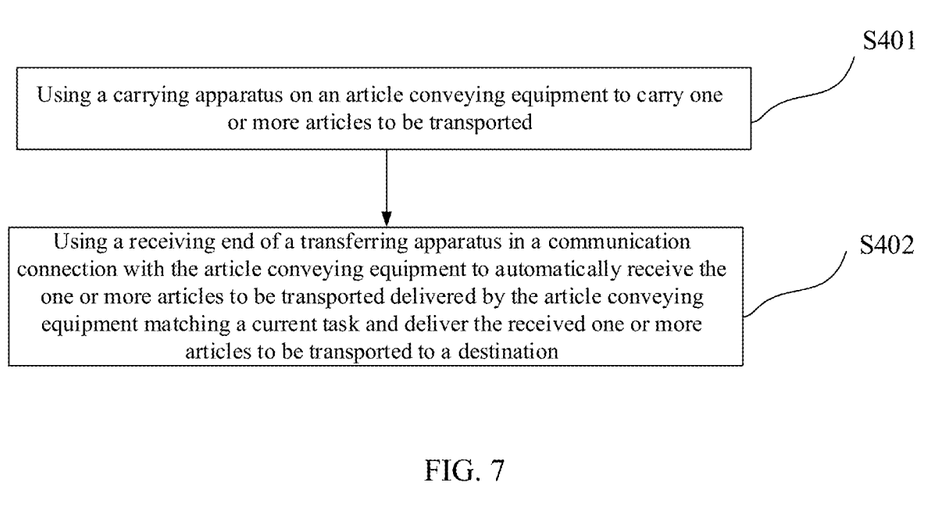
FIG. 7 is a flowchart illustrating an article conveying method according to an embodiment of the present application.

Corresponding to the apparatus embodiment described above, embodiments of the present application further provide an article conveying method. Referring to FIG. 7, the method includes steps described below.

In step S401, a carrying apparatus on an article conveying equipment is used to carry one or more articles to be transported.

The carrying apparatus is operative to carry one or more articles to be transported. The one or more articles to be transported may be a package, or may be other articles to be transported. The carrying apparatus is a common apparatus having a holding structure. After the article conveying equipment arrives at an article sending end (e.g., a feeding end for sending articles), the article may be placed on the carrying apparatus in a manual way, or the article to be transported, such as an article to be sorted, may be automatically placed by an automatic loading device (such as a manipulator) at the feeding end.

According to different conveying tasks, the carrying apparatus is capable of receiving one or more articles to be transported. The destinations of the one or more articles to be transported may be the same or different. When the delivery destinations are the same, the carrying apparatus may transport the article to be transported to an article receiving end (such as a conveyor belt and a cage trolley) at one time or in batches. When the delivery destinations are different, the carrying apparatus may release a corresponding article to be transported at article receiving ends representing different destinations, which can make full use of the space of the carrying apparatus and improve the efficiency of the article conveying equipment A1. In an embodiment, the article conveying equipment with an adaptive height may be a parcel delivery robot, and may also be other devices having the same or similar functions.

Optionally, after the carrying apparatus receives the article, the article conveying equipment A1 may learn article information of the article to be transported. The article information includes a delivery destination of the article to be transported (such as Beijing Haidian district) and the type of the article to be transported (such as a book or fragile goods). After learning the article information, the article conveying equipment A1 may obtain information of the transferring apparatus (such as a conveyor belt, a conveyor elevator and a cage trolley) corresponding to the article to be transported by inquiring a server. By inquiring the information of the transferring apparatus, a height of the receiving end A21 of the transferring apparatus matched with the article conveying equipment A1 is inquired. On one hand, the height of the receiving end A21 of the transferring apparatus matched with the article conveying equipment A1 may be issued by the server. On the other hand, a height database may exist inside the article conveying equipment A1, and the article conveying equipment A1 learns height information of the receiving end A21 of the transferring apparatus by inquiring the height database.

When the article conveying equipment A1 approaches the transferring apparatus, the height adjusting apparatus of the article conveying equipment A1 adjusts the height of the carrying apparatus so that the height of the carrying apparatus is matched with the height of the receiving end A21. The height adjusting apparatus may be a common hydraulic lifting apparatus, may also be a common helical lifting apparatus, and may also be other common lifting apparatuses, which is not limited herein.

In step S402, a receiving end of a transferring apparatus in a communication connection with the article conveying equipment is used to automatically receive the article to be transported delivered by the article conveying equipment matching a current task and to deliver the received one or more article to be transported to a destination.

The transferring apparatus A2 has the receiving end A21. The receiving end A21 may receive the article A4 delivered by the article conveying equipment A1. The article A4 is delivered to a corresponding receiving container A5 (e.g., a cage trolley, a package bag, etc.) through a delivery device (e.g., a conveyor belt) on the transferring apparatus. The transferring apparatus A2 has the receiving end A21 for receiving the one or more articles to be transported. The transferring apparatus A2 automatically receives articles to be transported delivered by the article conveying equipment A1 matching a current task through the receiving end A21 and transfers the received articles to be transported to the destination.

According to a specific implementation, the article to be transported includes path information, and the article conveying equipment A1 is capable of obtaining the path information of the article to be transported.

According to a specific implementation, the transferring apparatus A2 is provided with an identify (ID) label. The ID is matched with the path information of the article to be transported.

According to a specific implementation, the article conveying equipment A1 acquires the path information of the article to be transported in the current task, and determines, based on the path information of the article to be transported in the current task, the transferring apparatus A2 matched with the current task.

According to a specific implementation, the article conveying equipment A1 has the first height adjustment apparatus which may adjust a height of the carrying apparatus.

According to a specific implementation, a height of the receiving end A21 of the transferring apparatus A2 matching the current task is obtained, and the first height adjustment apparatus is controlled to lift the carrying apparatus to a first preset height. The first preset height matches the height of the receiving end A21 of the transferring apparatus A2 matching the current task.

According to a specific implementation, the transferring apparatus A2 is provided with a second height adjustment apparatus, which is operative to adjust the height of the receiving end A21.

According to a specific implementation, a height of the carrying apparatus of the article conveying equipment A1 matching the current task is obtained, and the second height adjustment apparatus is controlled to adjust the receiving end A21 to a second preset height, which matches the height of the carrying apparatus of the article conveying equipment A1 matching the current task.

According to a specific implementation, the method further includes:

providing a scheduling server to connect to at least one selected from the group consisting of the article conveying equipment A1 and the transferring apparatus A2.

According to a specific implementation, the scheduling server can acquire electric quantity information of the article conveying equipment A1.

When the remaining state of charge of the article conveying equipment A1 meets a preset condition, the scheduling server may control the article conveying equipment A1 to move to a preset area to get charged.

According to a specific implementation, the article conveying equipment A1 is navigated by identifying a combination of graphics.

Figure 5:
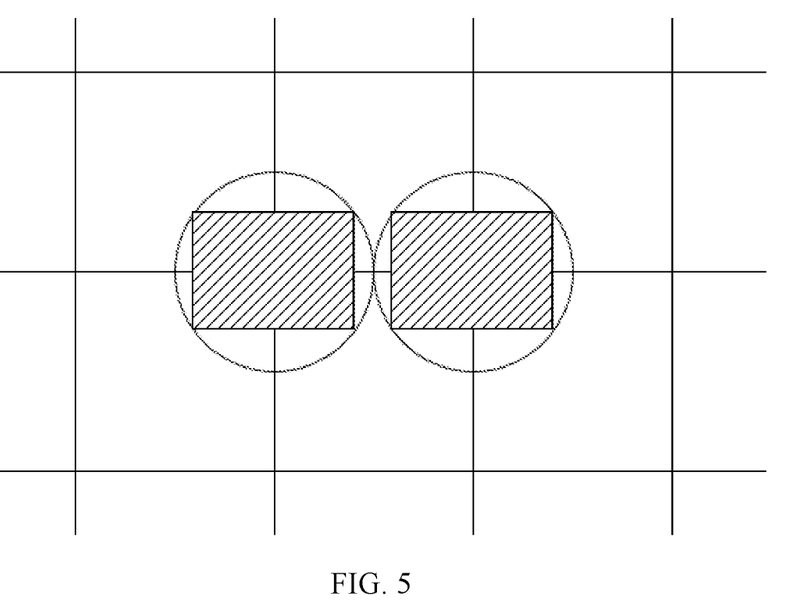
FIG. 5 is a schematic diagram illustrating a parcel robot operating in a mesh in the existing art.

At present, the map of a robot sorting system mostly is composed of grids (referring to FIG. To guarantee the robot to rotate freely, a maximum rotation diameter of the robot cannot exceed the size of the grids of the map. Therefore, the carrying mechanism of the robot is severely limited by the grids. If the grids are enlarged, the system efficiency will be costed. If the carrying mechanism of the robot is designed into a round edge, the size of the parcel carried also cannot be enlarged because express parcels mostly are rectangle, thus the problem cannot be fundamentally solved. Therefore, how to increase the size of the parcel carried by the robot as much as possible while keeping the map unchanged, or how to design the robot to make a basic walking unit of the robot map smaller and the map more flexible has become the major problem for robot design.

Figure 6:
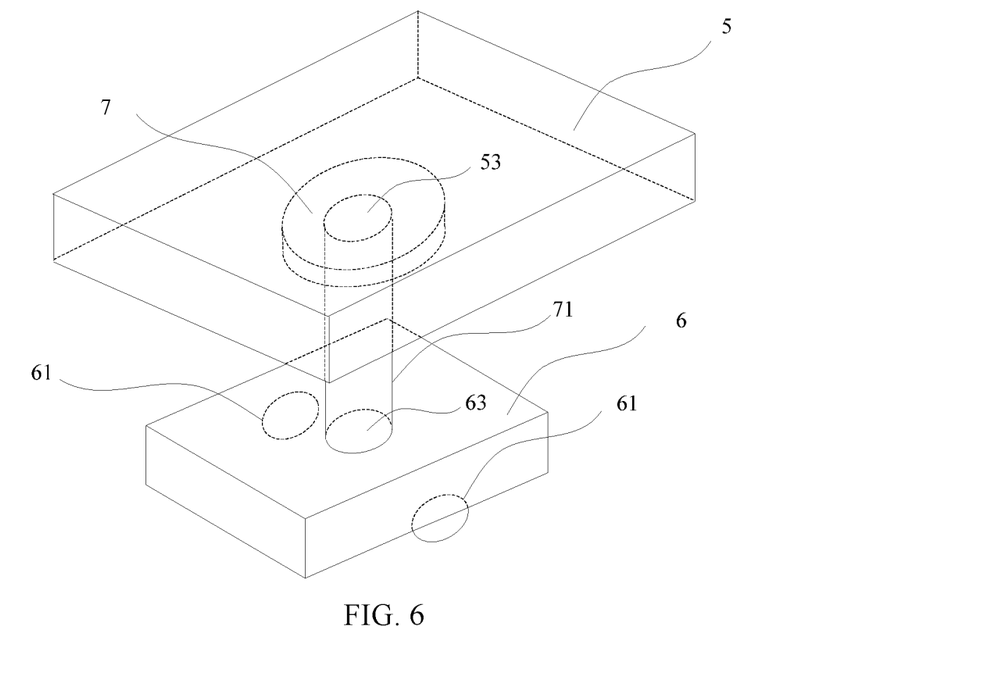
FIG. 6 is a structural diagram of an article conveying equipment according to another embodiment of the present application.

According to the above description, the design of the robot carrying mechanism is limited mainly because the parcel sorting robot needs to rotate freely in the map and it is to be guaranteed that no collision occurs during the rotation, thereby causing the limitation of carrying the parcel. This embodiment adds a rotation apparatus between a walking mechanism and a carrying mechanism of the robot, so that the robot may freely turn and walk by the rotation of a chassis of the robot while guaranteeing that the carrying apparatus and the parcel keep still. Referring to FIG. 6, this embodiment provides an article conveying equipment, that is, a mobile equipment used for conveying articles. The mobile equipment may be a parcel sorting robot or other types of robots for conveying articles. The mobile equipment includes an article holding platform 5, a travelling apparatus 6 and a rotation supporting apparatus 7.

The article holding platform 5 (such as a carrying apparatus) is configured to hold an article (such as an article to be transported) received by the mobile equipment. The article holding platform is configured to place the article to be transported such as a parcel. To guarantee that the article holding platform to efficiently transport the article, the form of transporting articles on the article holding platform is not limited and the apparatus such as a conveyer belt, a roller, a cross belt, a turning panel or a propelling apparatus may be adopted to transport the article. For example, when the conveyer belt, the roller or the cross belt is adopted, the position of the parcel may be acquired by measurement information of a sensor and the parcel is automatically adjusted by controlling the conveyer belt, the roller or the cross belt, so that a central position of the parcel is placed at a center of the article holding platform.

The travelling apparatus 6 includes at least two driving wheels 61 located at the bottom of the travelling apparatus 6. The at least two driving wheels 61 controls the mobile equipment to rotate in a first rotation direction. The travelling apparatus is a power core apparatus of the mobile equipment. When the two driving wheels run at a same speed in a same direction, the mobile equipment moves in straight line. When the two driving wheels operate at a differential speed, the turning of the mobile equipment may be achieved. When the two driving wheels operate at a same speed in an opposite direction, the pivot steering of the mobile equipment may be achieved. To guarantee a driving force of the driving wheels, a power apparatus, such as an electric motor may be disposed inside the travelling apparatus by which the driving wheels are enabled to rotate. Optionally, a rechargeable power source is also included inside the travelling apparatus for supplying energy to the whole mobile equipment. To guarantee the whole mobile equipment to receive a transport instruction, a communication module (such as a wireless fidelity (Wi-Fi) communication module) is integrated inside the travelling apparatus by which the travelling apparatus can receive an instruction for conveying the article and convey the article to a designed destination.

As an application scenario, the mobile equipment needs to move on the grid-type road shown in FIG. 5. Therefore, the travelling apparatus has an image recognition apparatus that can recognize the roadside. For example, the grid-type road is disposed with a two-dimensional code for the position navigation. The image recognition apparatus on the travelling apparatus can recognize the two-dimensional code, read a position marker represented by the two-dimensional code, thereby achieving the navigation function.

The rotation supporting apparatus 7 is located between the article holding platform 5 and the travelling apparatus 6, and is connected to the article holding platform 5 and the travelling apparatus 6 respectively. The rotation supporting apparatus 7 rotates in a direction opposite to a first rotation direction when the travelling apparatus 6 rotates in the first rotation direction. Through configuring such structure of the rotation supporting apparatus 7, when the mobile equipment rotates in situ, the article holding platform and the parcel are guaranteed to keep still as long as the rotation supporting apparatus is controlled to rotate at the same speed in an opposite direction. In this way, during the conveying process of the article by the mobile equipment, the article keeps moving forward at a fixed angle and position in the grid to avoid the congestion of the article delivery and reduction of the article delivery efficiency since a larger grid space is occupied for the rotation of the article.

The article conveying equipment provided by the present disclosure adds a rotation supporting apparatus between a travelling apparatus and a carrying apparatus of the equipment, so that the equipment may freely turn and move by the rotation of the device chassis while guaranteeing that the carrying apparatus and the parcel keep still. When the article conveying equipment rotates in situ, an article holding platform and parcel can remain still as long as the rotation supporting apparatus is controlled to rotate at the same angular speed in an opposite direction, thereby greatly improving the transport efficiency of the article conveying equipment.

To guarantee that the article holding platform on the mobile equipment can keep stable when the travelling apparatus 6 rotates, in an embodiment, when the travelling apparatus 6 rotates in the first rotation direction, the rotation supporting apparatus 7 rotates at a constant speed in a direction opposite to the first rotation direction. A speed sensor is disposed on the travelling apparatus and configured to learn a rotation speed of the driving wheels 61. A difference between the speeds of the driving wheels 61 is calculated to calculate a rotation angular speed caused by the difference. The rotation angular speed is passed to the rotation supporting apparatus 7 in real time, so that the rotation supporting apparatus 7 rotates at the constant speed in the direction opposite to the first rotation direction.

The lower the gravity of the mobile equipment is, the better the stability of the mobile equipment is. To guarantee the whole stability of the mobile equipment, in an embodiment, the article holding platform 5 has a first recess portion 53, and the rotation supporting apparatus 7 is mounted at the first recess portion 53 of the article holding platform 5. Alternatively, in an embodiment, the travelling apparatus 6 has a second recess portion 63, and the rotation supporting apparatus 7 is mounted at the second recess portion 63 of the travelling apparatus 6.

In an embodiment, to improve the article delivery efficiency of the mobile equipment and reduce the human participation in the conveying process of products, the article holding platform 5 is disposed with an article transporting apparatus, which is configured to transport the article on the article holding platform 5 to a designed destination. For example, when the mobile equipment arrives at an article receiving apparatus (such as a cage trolley), the article transporting apparatus on the article holding platform may be started and the article transporting apparatus automatically passes the article to be transported by the article transporting apparatus to the designed destination or container.

To guarantee that the article transporting apparatus may execute the article delivery task, the article transporting apparatus may obtain power from a power source (such as a battery) in the travelling apparatus. The article transporting apparatus may be a common mechanical structure apparatus for automatically delivering the article. For example, the article transporting apparatus is any one of a conveyer belt, a roller, a cross belt or a turning panel.

To keep the article stable during the conveying process, the article may be placed at the central position of the mobile equipment. In one embodiment, to guarantee that the conveyed article is placed at the central position of the mobile equipment, the article holding platform 5 is disposed with a sensing apparatus which can measure the position of the article on the article holding platform 5. The sensor may be a common pressure sensor. By measuring pressure data of different position on the article holding platform 5, different position of the article on the article holding platform 5 is obtained.

After measuring the position of the article on the article holding platform, the position of the article needs to be adjusted timely. In an embodiment, based on position data of the article on the article holding platform measured by the sensing apparatus, the article holding platform 5 controls the article transporting apparatus to move the article to the central position of the article holding platform 5. In addition, a camera may also be added on the mobile equipment, the camera observes the center of the article and tells the mobile equipment to adjust the position of the article by a server.

For the mobile equipment, multiple driving wheels 61 may be adopted to convey the article. However, the more the driving wheels are, the more complicate the control system becomes. In an embodiment, the number of the driving wheels 61 of the travelling apparatus 6 is two, or may be more than two.

In a case of two driving wheels 61, the movement direction and the rotation direction of the whole mobile equipment can be controlled as long as the rotation speed and rotation direction of the two driving wheels are controlled. For example, in an embodiment, the travelling apparatus 6 controls the two driving wheels 61 to run at the same speed in the same direction, so that the mobile equipment moves in the straight line direction. In another embodiment, the travelling apparatus 6 controls the two driving wheels 61 to run at the same speed in the opposite direction, so that the mobile equipment rotates in situ.

When the article is conveyed to a receiving container (such as the cage trolley) by the mobile equipment, usually the receiving opening of the receiving container has a different height, and the article holding platform of the mobile equipment may not reach this height, in this case, the height of the article holding platform needs to be conveniently adjusted. In an embodiment, the rotation supporting apparatus 7 further includes a stretchable supporting rod 71, which can control the height of the article holding platform 5. For example, before arriving at the preset receiving container, the mobile equipment previously obtains the height of the receiving opening of the receiving container. Before the mobile equipment arrives the receiving container, the supporting rod 71 is in a contraction state, and in this case, the gravity of the mobile equipment is low, which facilitates the stability in the movement process. When the mobile equipment arrives at the receiving container, the supporting rod 71 becomes a preset height, and the article is conveyed to the receiving container by the article transporting apparatus. After that, the supporting rod 71 becomes the contraction state again to keep the stability of the mobile equipment. The supporting rod 71 may be a common threaded rotation supporting rod, a common hydraulic supporting rod or a common mechanical structure that can perform the stretchable support.

To be able to suit the grid-type transport field shown in FIG. 5, it needs to be guaranteed that an area of the rotation supporting apparatus 7 and the travelling apparatus 6 in a horizontal direction is smaller than the area of the article holding platform in the horizontal direction. In this case, the article holding platform can receive as large an area as possible and the rotation supporting apparatus 7 and the travelling apparatus 6 cannot occupy too much area. As one case, a projection of the travelling apparatus 6 in a vertical direction is within the projection of the article holding platform 5 in the vertical direction. As another case, the projection of the rotation supporting apparatus 7 in the vertical direction is within the projection of the article holding platform 5 in the vertical direction. As another case, the projection of the rotation supporting apparatus 7 in the vertical direction is within the projection of the travelling apparatus 6 in the vertical direction.

The term "one" should be interpreted as "at least one" or "one or more". That is, the number of an element may be one in an embodiment and the number of the element may be above one in another embodiment. The term "one" should not be interpreted to limit the number.

Since an ordinal number such as "first" and "second" is used to describe various components and the ordinal number is not intended to limit these components herein. Those terms are only used to distinguish between one component and another component. For example, a first component may be referred to as a second component, and similarly, the second component may be referred to as the first component, without departing from the concept of the present application. The term "and/or" used herein includes any or all combinations of one or more listed associated articles.

Terms used herein are only used to describe an embodiment and not intended to limit the present disclosure. As used herein, a singular form is intended to include a plural form, unless clearly indicated in the context. In addition, it is to be understood that the terms "including" and/or "having" used in the specification are intended to mean the existence of the described features, numbers, steps, operations, components, elements or combinations thereof, without excluding the existence or addition of one or more other features, numbers, steps, operations, components, elements, or combinations thereof

What is claimed is:

1. An article conveying equipment, comprising:
    a carrying apparatus, configured to carry one or more articles to be transported, wherein the carrying apparatus is provided with a first recess portion at which the rotation supporting apparatus is mounted;
    a travelling apparatus, wherein the travelling apparatus comprises at least two driving wheels located at the bottom of the travelling apparatus, and the at least two driving wheels are configured to control the travelling apparatus to rotate in a first rotation direction; and
    a rotation supporting apparatus, which is located between the carrying apparatus and the travelling apparatus and connected to the carrying apparatus and the travelling apparatus respectively, wherein the rotation supporting apparatus is configured to rotate in a direction opposite to the first rotation direction when the travelling apparatus rotates in the first rotation direction.

2. The article conveying equipment according to claim 1, wherein when the travelling apparatus rotates in the first rotation direction, the rotation supporting apparatus is configured to rotate at a constant speed in the direction opposite to the first rotation direction.

3. The article conveying equipment according to claim 1, wherein the travelling apparatus is provided with a second recess portion at which the rotation supporting apparatus is mounted.

4. The article conveying equipment according to claim 1, wherein the carrying apparatus is provided with an article transporting apparatus on which the one or more articles to be transported is located, the article transporting apparatus is configured to transport the one or more articles to be transported to a designated destination.

5. The article conveying equipment according to claim 4, wherein the carrying apparatus is further provided with a sensing apparatus, which is configured to measure a position of the one or more articles to be transported on the carrying apparatus.

6. The article conveying equipment according to claim 5, wherein the carrying apparatus is configured to control, based on position data of the article to be transported on the carrying apparatus measured by the sensing apparatus, the article transporting apparatus to move the article to be transported to a central position of the carrying apparatus.

7. The article conveying equipment according to claim 1, wherein two driving wheels of the travelling apparatus are provided, and the travelling apparatus is configured to control the two driving wheels to run at a same speed in a same direction, so that the article transporting apparatus moves in straight line direction.

8. The article conveying equipment according to claim 1, wherein two driving wheels of the travelling apparatus are provided, and the travelling apparatus is configured to control the two driving wheels to operate at a same speed in an opposite direction, so that the article transporting apparatus rotates in situ.

9. The article conveying equipment according to claim 1, wherein the rotation supporting apparatus further comprises a retractable support rod, which is configured to control a height of the carrying apparatus.

10. The article conveying equipment according to claim 1, wherein a projection of the travelling apparatus in a vertical direction is within the projection of the carrying apparatus in the vertical direction.

11. The article conveying equipment according to claim 1, wherein a projection of the rotation supporting apparatus in a vertical direction is within the projection of the carrying apparatus in the vertical direction, or a projection of the rotation supporting apparatus in a vertical direction is within the projection of the travelling apparatus in the vertical direction.

12. An article conveying system, comprising:
an article conveying equipment, wherein the article conveying equipment comprises:
  a carrying apparatus, configured to carry one or more articles to be transported, wherein the carrying apparatus is provided with a first recess portion at which the rotation supporting apparatus is mounted;
  a travelling apparatus, wherein the travelling apparatus comprises at least two driving wheels located at the bottom of the travelling apparatus, and the at least two driving wheels are configured to control the travelling apparatus to rotate in a first rotation direction; and
  a rotation supporting apparatus, which is located between the carrying apparatus and the travelling apparatus and connected to the carrying apparatus and the travelling apparatus respectively, wherein the rotation supporting apparatus is configured to rotate in a direction opposite to the first rotation direction when the travelling apparatus rotates in the first rotation direction; and
  a transferring apparatus, wherein the transferring apparatus is in a communication connect with the article conveying equipment and comprises a receiving end configured for receiving the one or more articles to be transported, wherein the transferring apparatus is configured to automatically receive by the receiving end the one or more articles to be transported delivered by the article conveying equipment matching a current task and transfer the received one or more articles to be transported to a destination.

13. The article conveying system of claim 12, wherein the one or more articles to be transported comprise path information, and the article conveying equipment is operative to obtain the path information of the one or more articles to be transported.

14. The article conveying system of claim 13, wherein the transferring apparatus comprises an identify (ID) label, which matches the path information of the one or more articles to be transported.

15. The article conveying system of claim 14, wherein the article conveying equipment is configured to obtain the path information of the one or more articles to be transported delivered in the current task, and determine a transferring apparatus matching the current task based on the path information of the one or more articles to be transported delivered in the current task.

16. The article conveying system of claim 12, wherein the article conveying equipment comprises a first height adjustment apparatus operative to adjust a height of the carrying apparatus; and
the article conveying equipment is configured to obtain a height of a receiving end of a transferring apparatus matching the current task and control the first height adjustment apparatus to lift the carrying apparatus to a first preset height, and the first preset height matches the height of the receiving end of the transferring apparatus matching the current task.

17. The article conveying system of claim 12, wherein the transferring apparatus comprises a second height adjustment apparatus operative to adjust a height of the receiving end; and
the transferring apparatus is configured to obtain a height of the carrying apparatus of the article conveying equipment matching the current task and control the second height adjustment apparatus to adjust the receiving end to a second preset height, and the second preset height matches the height of the carrying apparatus of the article conveying equipment matching the current task.

18. The article conveying system of claim 12, further comprising:
a scheduling server, connected to at least one selected from the group consisting of the article conveying equipment and the transferring apparatus.

19. An article conveying method, performed by the article conveying equipment according to claim 1 and a transferring apparatus in a communication connection with the article conveying equipment, comprising:
carrying, by the article conveying equipment, one or more articles to be transported;
delivering, by the article conveying equipment, the one or more articles matching a current task;
automatically receiving, by the transferring apparatus, the one or more articles matching the current task at a receiving end of the transferring apparatus; and
delivering, by the transferring apparatus, the received one or more articles matching the current task to a destination.

* * * * *